United States Patent [19]

Mee et al.

[11] 3,982,049
[45] Sept. 21, 1976

[54] METHOD FOR PRODUCING SINGLE CRYSTAL FILMS

[75] Inventors: Jack E. Mee, Anaheim; Thomas N. Hamilton, Fullerton, both of Calif.; John L. Archer, Ames, Iowa; David M. Heinz, Orange, Calif.

[73] Assignee: Rockwell International Corporation, El Segundo, Calif.

[22] Filed: July 15, 1974

[21] Appl. No.: 488,360

Related U.S. Application Data

[63] Continuation of Ser. No. 833,268, June 16, 1969, abandoned.

[52] U.S. Cl................................. 427/128; 427/248
[51] Int. Cl.².................... C23C 11/08; H01F 1/34
[58] Field of Search..................... 117/106 R, 235; 427/128, 248

[56] References Cited
UNITED STATES PATENTS

| | | | |
|---|---|---|---|
| 3,386,852 | 6/1968 | Mee et al........................ | 117/106 R |
| 3,429,740 | 2/1969 | Mee............................. | 117/106 R |
| 3,486,937 | 12/1969 | Unares........................... | 117/236 |

OTHER PUBLICATIONS

"Epitaxial Ferrite Memory Planes", by G. R. Polliam et al, Proceeding Nat'l Aerospace Electronics Conference, (Dayton, Ohio 1965), pp. 241–245.

"Chem. Vapor Deposition of Single Crystals Metal Oxides II, Encapsulation of Polycrystalline Conductors in Single Crystal Ferrite", by J. L. Arcner et al, presented at International Conference on Crystal Growth, June 1966.

"Magnetic Oxide Films", by J. E. Mee et al, IEEE Transactions on Magnetics, vol. MAG–S, No. 4, Dec. 1969, pp. 717–727.

Primary Examiner—Harris A. Pitlick
Attorney, Agent, or Firm—Robert Ochis; G. Donald Weber, Jr.; H. Fredrick Hamann

[57] ABSTRACT

The reaction zone for the deposition of a metal oxide film on a crystal substrate inside a reaction chamber is shifted during a chemical vapor deposition process by the systematic control of the process parameters of the system.

13 Claims, 3 Drawing Figures

METHOD FOR PRODUCING SINGLE CRYSTAL FILMS

This is a continuation of application Ser. No. 833,268 filed June 16, 1969 and now abandoned.

BACKGROUND OF THE INVENTION

1. Field of the Invention

The invention relates to a chemical vapor deposition process for growing epitaxial garnet crystals and complex metal oxide crystals other than garnet crystals by controlling the location of the reaction zone of the process.

2. Description of Prior Art

Techniques for obtaining magnetic oxide films on crystalline substrate include spraying suspension of reactants onto heated substrates, vacuum depositing metal alloys with subsequent oxidation, and chemically depositing on a substrate from mixed nitrate solutions followed by a firing of the material. More recently, EuO films have been prepared by electron beam evaporation and garnet films have been deposited by r-f sputtering.

Cech and Alessandrini by a paper entitled "Preparation of FeO, NiO, and CoO Crystals by Halide Decomposition," Trans. Am. Soc. Metals 50, 150, (1959), reported the epitaxial growth of certain materials by a chemical vapor deposition (CVD) method. Others independently extended the techniques reported and showed that complex metal oxides, specifically ferrites, could also be grown epitaxially by the CVD method. According to various publications, successful epitaxial growth techniques include CVD, r-f sputtering, and growth from molten solution (flux method).

At the present time, the emphasis in this field is on epitaxial films produced by the CVD method and on both epitaxial and polycrystalline films by the r-f sputtering method. However, the films grown by the CVD method, while exhibiting preferred characteristics, have been difficult to reproduce.

A CVD process is preferred in which the film deposited by the CVD method can be accurately and reliably reproduced. The present invention provides such a process.

SUMMARY OF THE INVENTION

Briefly, the invention comprises a chemical vapor deposition process for growing epitaxial crystals by controlling the location of the reaction zone for the deposition of metal oxide films in order to accurately reproduce crystal growth and to vary the deposited products on a crystal substrate. The process includes the steps of elevating the temperature of a substrate (or seed) crystal in a reaction chamber and reacting oxidizing gases of water vapor and/or oxygen with gases of certain metal halides at the substrate crystal surface to deposit a desired product. The position of the reaction zone is varied relative to the substrate by varying the process parameters and/or the crystal substrates to obtain a desired crystal growth.

Therefore, it is an object of this invention to provide an improved chemical vapor deposition process for reproducing single crystal deposits on substrates.

A further object of this invention is to provide a chemical vapor deposition process in which the reaction zone is shifted, or controlled, relative to the substrate location to reproduce single crystal growth on a crystalline substrate.

A still further object of this invention is to provide a chemical vapor deposition process capable of adjusting the reaction zone step for growing epitaxial garnet crystals.

Another object of the invention is to provide a chemical vapor deposition process using a shifting reaction zone process for growing epitaxial complex metal oxide crystals.

A further object of the invention is to provide a process for accurately reproducing single crystal deposits on a substrate (or seed) crystal by controlling the reaction zone relative to the position of the substrate to accurately reproduce single crystal deposits or for obtaining deposits of other products.

These and other objects of the invention will become more apparent when taken in connection with the description of the drawings, a brief description of which follows:

DESCRIPTION OF PREFERRED EMBODIMENT

In simple chemical deposition processes, mixing of reactant vapors involves bringing together metal halide vapors and water and/or oxygen vapors near a crystal substrate (or seed) so that they react and deposit a metal oxide on the seed. The only problem usually involved, particularly in the case of simple binary oxides, is to mix the gases at the right place in the reactor so that the proper metal halide and oxidizing agent concentrations exist near the substrate to give good single crystal growth. The situation for garnet depositions is more involved since the reactions require the $YCl_3$ and $FeCl_2$ to be intimately mixed before being mixed with the water and oxygen vapors.

Figure 1:
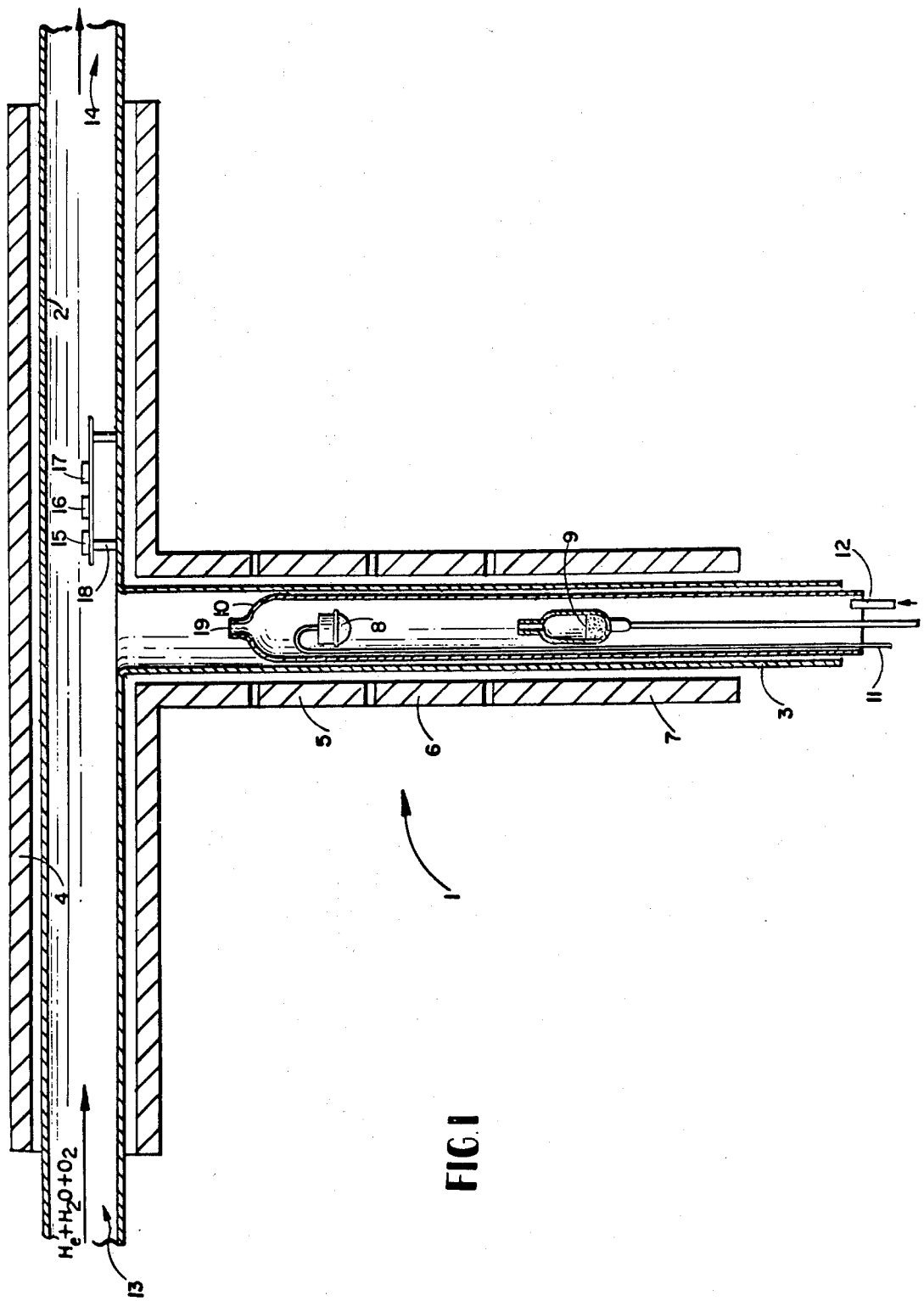
FIG. 1 is a cross-sectional view of a "T"-reaction chamber for use in chemical deposition processes.

FIG. 1 illustrates a "T"-shaped reactor 1 for use in garnet deposition. The reactor is designed for relatively high temperatures to accomodate the less volatile $YCl_3$. The "T"-shaped reactor includes horizontal chamber 2 and vertical chamber 3. Disposed about the horizontal chamber is reaction zone heater 4. Individual source material heaters 5, 6, and 7 are disposed about the vertical chamber. Enclosed within the vertical chamber are crucibles 8 and 9 for maintaining source materials. The crucibles are enclosed within premix tube 10. Tubular inlets 11 and 12 are provided to introduce gases into the vertical chamber for transporting the source materials into the horizontal reaction chamber.

The flow rate of the source material from crucible 9 can be varied by varying the temperature of heater 7 for the particular embodiment shown. The flow rate of the source material for crucible 8 can also be varied by varying the temperature of heater 5 and, in addition, by varying the flow rate of the gas introduced into the crucible from inlet 11. The horizontal reaction chamber includes inlet 13 through which helium, water and oxygen gases may be emitted and exhaust outlet 14 for conducting the unreacted gases from the chamber. The gases from inlet 19 transport the premixed metal halides into the reaction zone of the reactor.

The crystal (or seed) substrates 15, 16 and 17 (for the FIG. 1 embodiment) are placed on a fused-silica holder 18 in the horizontal chamber. The position of the holder is adjusted during the process as is described subsequently.

Generally, during a process, the temperature of the crystals is elevated by means of the reaction zone heater 4. The source material heaters 5–7 are elevated to the desired temperature after the heaters have reached the desired temperature, the crucibles inside the premix tube are inserted into the vertical chamber 3.

Gases are emitted into the vertical chamber through inlets 11 and 12 to conduct the metal halides through opening 19 of the premix tube 10 into the horizontal reaction chamber. The oxidizing gases of water vapor ($H_2O$) and/or oxygen ($O_2$) from inlet 13 of the chamber is then reacted with the metal halides from the crucible at the substrate crystal surfaces to produce the desired growth compound. More specifically, for yttrium iron garnet ($Y_3Fe_5O_{12}$) crystal growth on the substrates, the reaction is believed to be:

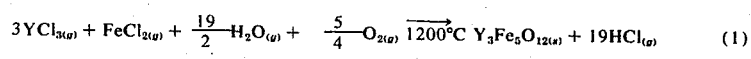

$$3YCl_{3(g)} + FeCl_{2(g)} + \frac{19}{2} H_2O_{(g)} + \frac{5}{4} O_{2(g)} \xrightarrow{1200°C} Y_3Fe_5O_{12(s)} + 19HCl_{(g)} \quad (1)$$

The substrate crystals for the yttrium iron garnet films may be yttrium iron garnet or other garnets, such as yttrium aluminum garnet ($Y_3Al_5O_{12}$) or gadolinium gallium garnet ($Gd_3Ga_5O_{12}$). Anhydrous yttrium chloride, $YCl_3$, and iron (II) chloride, $FeCl_2$, are maintained in the crucibles in their individual temperature zones of the vertical chamber. The heaters are activated so that the materials are elevated to a temperature where their vapor pressure is approximately 0.1 atm.

Dry helium is introduced into the premix tube to transport the $YCl_3$ and $FeCl_2$ vapors into the reaction zone of the horizontal portion of the chamber. Dry hydrogen chloride, HCl, gas flows directly into the crucible which holds the $YCl_3$. The HCl gas sweeps the heavy $YCl_3$ vapors out of the crucible into the gas stream and prevents the very reactive $YCl_3$ vapors from reacting at an uncontrollably fast rate with the water and oxygen vapors from inlet 13. Helium is bubbled through water at room temperature and then, along with the $H_2O$ and $O_2$, is injected into the horizontal chamber.

The reaction deposition zone is in the downstream portion of the horizontal chamber just adjacent to the "T"-junction of the chamber. The substrate (or seeds) are placed on the quartz holder in the non-reactive, upstream, horizontal chamber until the reaction conditions have been stabilized. The process parameters are varied until the reaction zone has been shifted to the desired position.

The shifting of the reaction zone is made possible by the fact that there may be more than one possible product when mixtures of vapors of two or more metal halides are reacted with $H_2O$ and/or $O_2$ oxidizing vapors. In addition, the shifting reaction zone process is based on the fact that the two or more metal halides involved have different reactivities with respect to the deposition reaction and that the different products occur in an orderly manner which can be predicted and controlled by determining the relative reactivities of the metal halides.

Specifically, for the reaction of $YCl_3$ and $FeCl_2$ vapors with $H_2O$ and/or $O_2$ vapors, other possible products besides yttrium iron garnet ($Y_3Fe_5O_{12}$) are $Y_2O_3$, $YFeO_3$, and $Fe_2O_3$ by reactions such as:

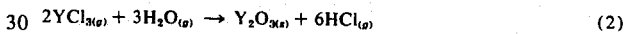

$$2YCl_{3(g)} + 3H_2O_{(g)} \rightarrow Y_2O_{3(s)} + 6HCl_{(g)} \quad (2)$$

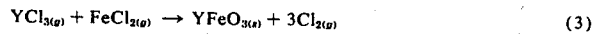

$$YCl_{3(g)} + FeCl_{2(g)} \rightarrow YFeO_{3(s)} + 3Cl_{2(g)} \quad (3)$$

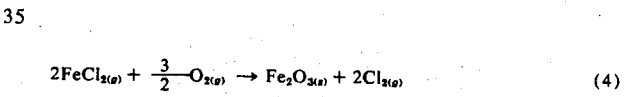

$$2FeCl_{2(g)} + \frac{3}{2} O_{2(g)} \rightarrow Fe_2O_{3(s)} + 2Cl_{2(g)} \quad (4)$$

Because $YCl_{3(g)}$ is much more reactive than $FeCl_{2(g)}$ in the types of reactions shown by the above equations, these products appear in the order $Y_2O_3$, then $YFeO_3$, then $Y_3Fe_5O_{12}$ and then $Fe_2O_3$. The location of the products in the reaction zone is shown more specifically in FIG. 2. As indicated therein, the product $Y_2O_3$ occurs first in the reaction zone. Following the $Y_2O_3$ is the $YFeO_3$, the $Y_3Fe_5O_{12}$, and the $Fe_2O_3$. The products may be identified by X-ray powder patterns well known in the art.

Table 1

| Column 1 Condition | Column 2 First Successful YIG Deposition Conditions | Column 3 Later YIG Deposition Conditions | Column 4 Early YIG Deposition Conditions | Column 5 Thick YIG Deposition Conditions | Column 6 YFeO₃ |
|---|---|---|---|---|---|
| Substrate temperaure | 1200°C | 1200°C | 1225°C | 1225°C | 1225°C |
| Vertical helium flow rate | 10.0 liters/min | 10.0 liters/min | 6.00 liters/min | 6.00 liters/min | 6.00 liters/min |
| Horizontal helium flow rate | 2.5 liters/min | 2.5 liters/min | 2.75 liters/min | 2.75 liters/min | 2.75 liters/min |
| Fraction of horizontal helium bubbled through water at room temperature | 1 | 1/10 | 1/10 | — | — |
| Helium directly over YCl₃ cup | 0.25 liters/min | 0.25 liters/min | 0 | 0 | 0 |
| HCl gas flow rate | 0.15 liters/min | 0.046 liters/min | 0.062 liters/min | 0.094 liters/min | 0.016 liters/min |
| Oxygen flow rate | 0.01 liters/min | 0.03 liters/min | 0.033 liters/min | 0.033 liters/min | 0.033 liters/min |
| YCl₃ transport rate | 0.20 gms/hr | 0.20 gms/hr | 0.46 gms/hr | 0.64 gms/hr | 0.52 gms/hr |
| FeCl₂ transport rate | 1.80 gms/hr | ~5.0 gms/hr | 5.7 gms/hr | 10 gms/hr | 1.2 gms/hr |
| Length of Y₃Fe₅O₁₂ zone | ≤1 cm | 6–8 cm | 6–8 cm | 6–8 cm | 4–6 cm |
| YIG deposition rate | ≤0.5μ/hr | ~10μ/hr | ~6μ/hr | 12μ/hr | 6μ/hr |

Table 1-continued

Conditions for CVD of Epitaxial YIG Using T-Reactors

| Column 1<br>Condition<br>(on front seed) | Column 2<br>First Successful<br>YIG Deposition<br>Conditions | Column 3<br>Later YIG<br>Deposition<br>Conditions | Column 4<br>Early YIG<br>Deposition<br>Conditions | Column 5<br>Thick YIG<br>Deposition<br>Conditions | Column 6<br>$YFeO_3$ |
|---|---|---|---|---|---|

Figure 2:
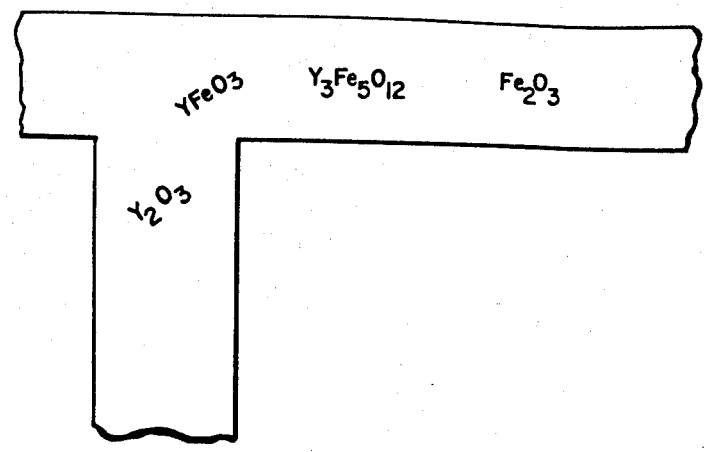
FIG. 2 is an illustration of the reaction zone inside a reaction chamber and the various products deposited therein.

As indicated by FIG. 2 and the above description, there may be more than one product in the reaction zone. In addition, the various products in the zone occur in an orderly manner in partially, or totally, separated zones within the reaction chamber. The following examples illustrate how the total deposition zone can be shifted by varying certain process parameters and how individual zones can be shifted or expanded, or contracted, by varying certain process parameters.

The reaction chamber utilized in the examples was comprised of fused-silica tubing having an outside diameter of 57 mm. The horizontal chamber of the reaction chamber was approximately 5 feet long, and the vertical chamber was approximately 4 feet long. Each of the chambers was surrounded by individual furnaces which permitted separate temperature control in the crucible and substrate areas as illustrated in FIG. 1. Table I is a summary of the conditions for the first five examples. Column 1 of Table I contains an explanation of the process parameters of each of the examples.

EXAMPLE I

Figure 3:
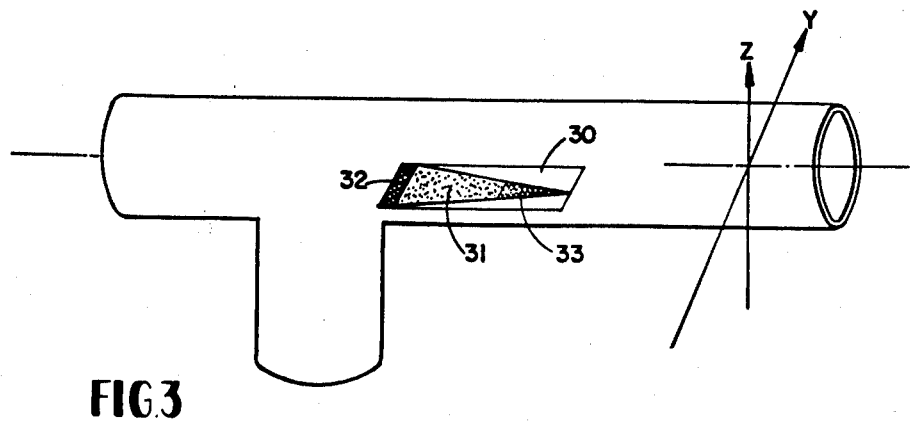
FIG. 3 is an illustration of a typical deposition pattern on a plate inside a reaction chamber.

As indicated in Column 2, Table I, the length of the $Y_3Fe_5O_{12}$ zone was relatively short (less than or equal to 1 cm.). In addition, the $Y_3Fe_5O_{12}$ zone moved upstream or downstream in the horizontal chamber during the series of processes conducted so that it was very difficult to accurately reproduce the films. Various process parameters were changed and the deposit zone was probed by investigating the deposits formed on the fused-silica plates. FIG. 3 is an illustration of the types of deposits formed on silica plate 30, placed in the deposit zone during processes. As indicated by deposits on the plate, the yttrium iron zone 31 occurred between the $YFeO_3$ zone 32 and the $Fe_2O_3$ zone 33. The deposits on the test plate 30 indicated the location and length of the zone for each of the products. Since yttrium iron garnet (YIG) was the desired product for the first series of tests, the effect of the parameter changes on the YIG zone was measured after each test. When the process conditions appeared most promising, yttrium iron garnet was deposited on prepared $Y_3Al_5O_{12}$ substrates, $Gd_3Ga_5O_{12}$ substrates, and $Y_3Fe_5O_{12}$ substrates.

EXAMPLE II

The optimum conditions resulting from the variations during the Example I series of processes are summarized in Column 3 of Table I. As indicated therein, the yttrium iron garnet zone was increased from approximately 1 cm. to approximately 8 cm. by increasing the flow rate of oxygen and decreasing the HCl and by increasing the $FeCl_2$ transport rate. The growth rate of the yttrium iron garnet on the substrate was seen to increase from approximately 0.5 microns per hour to approximately 10 microns per hour.

EXAMPLE III

A reactor having a relatively longer vertical chamber (approximately 1 ft. longer) and different heating arrangement was used. The parameters were varied until an acceptable YIG reaction zone and deposition rate was established. The optimum conditions are summarized in Column 4, Table I. As indicated therein, the reaction zone was approximately 8 cm.; and the deposit rate was approximately 6 microns per hour.

EXAMPLE IV

The $YCl_3$ and $FeCl_2$ transport rates were increased. As a result, the deposition rate increased to 12 microns per hour. The length of the YIG zone remained approximately the same.

EXAMPLE V

The HCl gas flow rate was substantially reduced and the helium over the $YCl_3$ crucible was eliminated so that $YFeO_3$ was the major product on the fused-silica test plate during the process runs. The reactor having the relatively long vertical chamber was used during the fifth example. The conditions are summarized in Column 6 of Table I. $YFeO_3$, which is an ortho-ferrite, was deposited on a yttrium orthoaluminate ($YAlO_3$).

The process described herein was also applied to other chemical vapor deposition systems as described in the following examples VI through VII.

EXAMPLE VI

Epitaxial manganese ferrite ($MnFe_2O_4$) was grown on MgO substrate crystals by the reaction of $MnBr_2$ and $FeBr_2$ vapors with $H_2O$ and $O_2$ vapors. The $FeBr_2$ is more reactive than the $MnBr_2$ so that the first deposits on the crystal were richer in Fe. However, it was noted that in this deposition process, the deposits were not separate compounds as were seen to exist in the yttrium iron system. The deposits were seen to be solid solutions of the compound $Mn_xFe_{3-x}O_4$, where $x$ varies continuously from near zero in the first deposit in the horizontal chamber to 1 or even greater than 1 in deposits downstream from the junction of the two chambers.

EXAMPLE VII

Epitaxial $Gd_3Fe_5O_{12}$ were grown on garnet substrate crystals by the reaction of mixtures with vapors of gadolinium halide and an iron halide with vapors of $H_2O$ or $O_2$. The gadolinium halide was more reactive than the iron halide so that the deposits occurred in the following order: $Gd_2O_3$, $GdFeO_3$, $Gd_3Fe_5O_{12}$, and $Fe_2O_3$.

In general, based on the series of processes conducted (see above examples), it was concluded that for a reaction of a mixed halide vapor $AX_m$ and $BX_n'$ with $H_2O$ and $O_2$ vapors, if $AX_m$ is more reactive than $BX_n'$, the first oxide deposit will always be rich in A and the proportion of B to A increases for downstream deposits for normal transport rates of $AX_m$ and $BX_n'$. The A and B terms are used to represent the metals shown in the equations of the previous examples. The X terms are used to represent the halides of the formulas used in the previous examples. The deposits were seen to be either separate compounds or the same compounds with varying B:A ratios depending on the nature of the phases which exist in $A_2O_m$—$B_2O_n$ system up to the deposition temperature, e.g., in the $Y_2O_3$—$Fe_2O_3$ system, the compounds $Y_2O_3$, $YFeO_3$, $Y_3Fe_5O_{12}$, and $Fe_2O_3$ exist with narrow ranges of stoichiometry. However, in the $Mn_3O_4$—$Fe_3O_4$ system, a continuous solid solution, $Mn_xFe_{3-x}O_4$, exists between the end members $Mn_3O_4$ and $Fe_3O_4$.

Based on the previous examples, it should be concluded that the steps of the process include first determining the relative reactivities of the reactant metal halides (source materials). After the relative reactivities have been determined, the process is conducted and the various products are identified and their order of appearance on a test plate is determined. The parameters are then adjusted to shift the total reaction zone and/or to expand or shift the desired product zone. After the desired product zone has been obtained, final adjustments are made to the process parameters to obtain good quality products, i.e., desired thickness and/or product deposition rate. In some cases, the deposition crystal can be shifted in the reaction chamber to obtain the desired relationships of the reaction zone to the crystal substrate.

We claim:

1. A method of optimizing the deposition of a deposit of a desired complex metal oxide, with respect to at least one selected characteristic of the deposit of said desired complex metal oxide, said at least one selected characteristic being selected from the group consisting of, location of the zone where said desired complex metal oxide deposits, size of the zone where said desired complex metal oxide deposits, rate of deposition of said desired complex metal oxide and purity of said desired complex metal oxide deposit, said method comprising:

performing steps A and B a plurality of times and performing step C prior to at least one repetition of step A;

A. reacting metal halides with an oxidizing gas in a reaction chamber to form a deposit of a plurality of metal oxides at different locations on a substrate means, said metal oxides including said desired complex metal oxide, said oxidizing gas consisting of at least one gas selected from the group consisting of water vapor and $O_2$;

B. determining from said deposit of a plurality of metal oxides the quality of said at least one selected characteristic of said desired complex metal oxide deposit which is obtained under the reaction conditions extant during the formation of said deposit of a plurality of metal oxides;

C. altering at least one reaction condition, said at least one reaction condition being selected from the group consisting of substrate means temperature, the quantities of metal halides and the quantity of the oxidizing gas;

D. determining from the qualities of said at least one selected characteristic of the deposits of a plurality of metal oxides formed under a plurality of different reaction conditions, the reaction conditions which yield a deposit of said desired complex metal oxide which is optimized with respect to at least one selected characteristic.

2. The method recited in claim 1 wherein the altering step includes the step of varying the quantities of the metal halides.

3. The method recited in claim 2 wherein said step of varying the quantities of the metal halides includes the step of changing the relative quantities of the metal halides.

4. The method recited in claim 1 wherein the altering step includes the step of varying the quantity of at least one metal halide.

5. The method recited in claim 1 wherein the altering step includes the step of varying the quantity of oxidizing gas.

6. The method recited in claim 5 wherein said step of varying the quantity of oxidizing gas includes the step of changing the relative quantities of water vapor and $O_2$.

7. The method recited in claim 1 wherein the altering step includes the steps of:
varying the quantities of said metal halides; and
varying the quantity of the oxidizing gas.

8. The method recited in claim 1 wherein said desired complex metal oxide is a garnet and the selected characteristic is the size of the zone in which said garnet is deposited.

9. The method recited in claim 1 wherein the desired complex metal oxide is an orthoferrite and the selected characteristic is the size of the zone in which said orthoferrite is deposited.

10. The method of claim 1 wherein said at least one selected characteristic includes the size of the zone where the desired complex metal oxide deposits and wherein said substrate means is sufficiently large in at least one dimension to extend beyond the zone in which said desired complex metal oxide deposits.

11. The method in claim 1 further comprising steps E and F:

E. placing a seed substrate in said zone where said desired complex metal oxide deposits; and F. reacting said metal halides with said oxidizing gas in said reaction chamber under optimized reaction conditions to form a single crystalline deposit of said desired complex metal oxide on said seed substrate.

12. The process recited in claim 1 including the step of initially determining the relative reactivities of said metal halides.

13. The process recited in claim 1 wherein said substrate means is a single test plate whereby said deposit is on the single test plate.

* * * * *